United States Patent

[11] 3,624,826

| [72] | Inventor | Charlie M. Rogers |
| | | Mancos Rt. 2, Colo. 81323 |
| [21] | Appl. No. | 803,308 |
| [22] | Filed | Feb. 28, 1969 |
| [45] | Patented | Nov. 30, 1971 |

[54] ROTARY MECHANICAL DITCH CLEANER
3 Claims, 6 Drawing Figs.

[52] U.S. Cl. ................................................ 37/92, 172/393, 172/108, 172/112
[51] Int. Cl. .................................................... E02f 5/08, A01b 33/04
[50] Field of Search ........................................ 37/92, 93; 172/108, 109, 80, 112, 28, 30, 39, 393, 387

[56] References Cited
UNITED STATES PATENTS

| 1,035,025 | 8/1912 | Mahoney | 172/393 |
| 1,052,479 | 2/1913 | Greimann | 172/393 |
| 1,095,097 | 4/1914 | Fournet | 37/92 |
| 2,051,443 | 8/1936 | Gravely | 37/92 |
| 2,615,263 | 10/1952 | Barras | 37/92 |
| 2,679,703 | 6/1954 | Borel | 37/92 |
| 2,737,734 | 3/1956 | Barras | 37/92 |
| 2,965,985 | 12/1960 | Sillasen et al. | 37/92 |
| 3,132,430 | 5/1964 | Barras | 37/92 |
| 3,168,785 | 2/1965 | Davis | 37/92 |
| 3,411,225 | 11/1968 | Barras | 37/93 |
| 3,417,495 | 12/1968 | Barras | 37/93 |
| 3,455,039 | 7/1969 | Andrew | 37/93 |

FOREIGN PATENTS

| 145,507 | 1950 | Australia | 37/92 |
| 216,979 | 1957 | Australia | 37/92 |
| 248,342 | 1962 | Australia | 37/92 |

*Primary Examiner* — Robert E. Pulfrey
*Assistant Examiner* — Clifford D. Crowder
*Attorney* — Berman, Davidson and Berman

ABSTRACT: An irrigation ditch cleaner consisting of a T-shaped frame bar adapted to be attached to a tractor. A transverse rotor is journaled to the frame bar and has cutting blades and fins. The rotor is adapted to be drivingly connected to the power takeoff shaft of the tractor. The frame bar has a transverse guard shield with an inclined top deflection flange, the shield being located forwardly adjacent the rotor flange overlying the rotor. The shield has spaced parallel longitudinal forwardly extending supporting skids at its bottom end adapted to slidably support the rotor in a ditch to be cleaned.

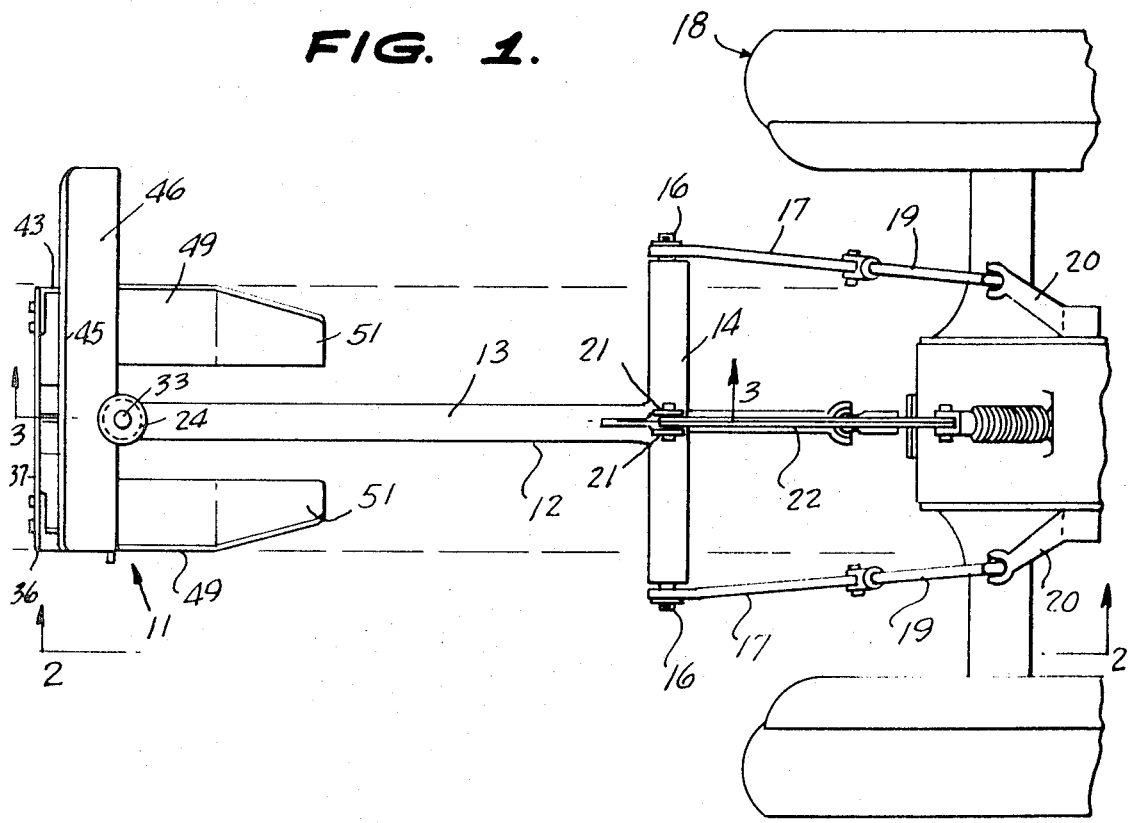
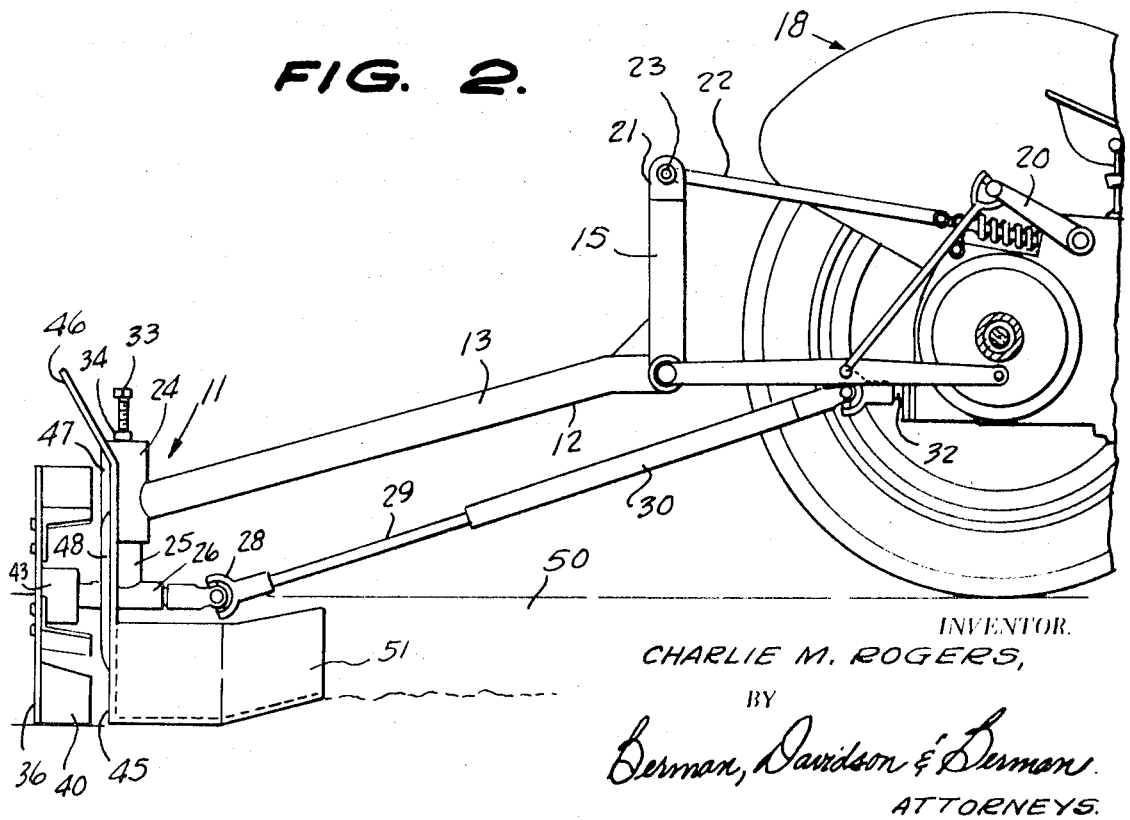
INVENTOR.
CHARLIE M. ROGERS,
BY
Berman, Davidson & Berman
ATTORNEYS.

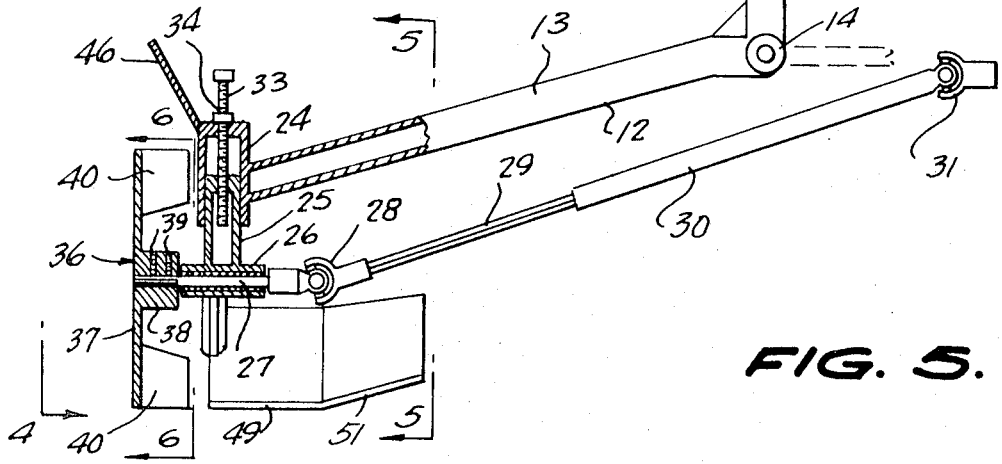
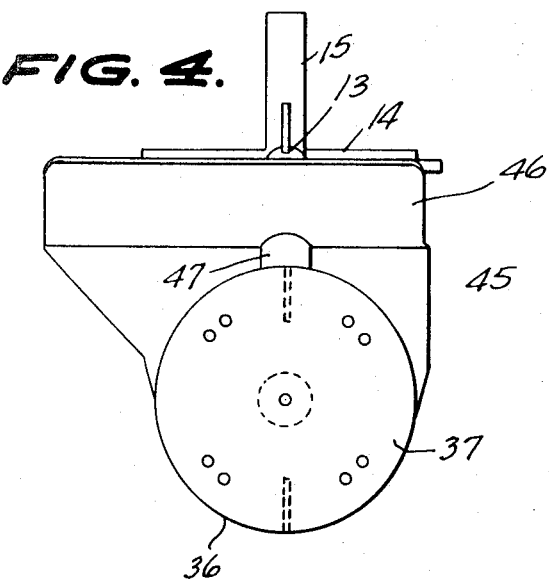
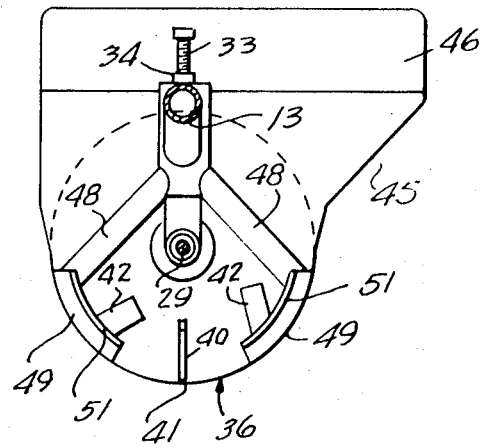
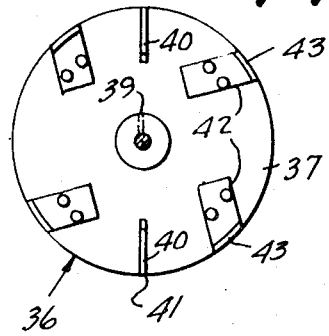

ROTARY MECHANICAL DITCH CLEANER

This invention relates to ditch-clearing devices, and more particularly to a ditch cleaner of the type having a rotary digging element.

A main object of the invention is to provide a novel and improved implement particularly adapted for use in clearing irrigation ditches of grass, weeds, silt, or other undesirable foreign material, the device being relatively simple in construction, being easy to operate, and being so arranged that it does not plug the outlets of a system in which it is employed.

A further object of the invention is to provide an improved irrigation ditch-cleaning device which is relatively inexpensive to fabricate, which is sturdy in construction, which is accurately adjustable to provide the desired depth of cleaning action, and which is so arranged that material removed from a ditch by the apparatus will be thrown clear of the ditch so that said material will not return.

A still further object of the invention is to provide an improved ditch-cleaning implement adapted to be attached to a conventional tractor and to be energized therefrom, the device providing efficient clearing action and being usable to clean a ditch whether the ditch contains water, or is in a dry condition, being so arranged so that it will clean a ditch without making it deeper or wider, and being likewise arranged so that it will not leave a plug in the ditch when it is elevated therefrom.

A still further object of the invention is to provide an improved ditch-cleaning implement which is compact in size, which is relatively light in weight, which is easy to adjust for desired depth of action, which does not damage a ditch in which it is employed, and which does not break the seal in ditches having a special lining material therein for sealing action.

Further objects and advantages of the invention will become apparent from the following description and claims, and from the accompanying drawings, wherein:

FIG. 1 is a top plan view of an improved ditch-clearing implement constructed in accordance with the present invention, shown operatively attached to the rear end portion of a conventional tractor.

FIG. 2 is a longitudinal vertical cross-sectional view taken substantially on the line 2—2 of FIG. 1 and showing the ditching apparatus in side elevation.

FIG. 3 is a longitudinal vertical cross-sectional view taken substantially on the line 3—3 of FIG. 1.

FIG. 4 is a rear elevational view taken substantially on the line 4—4 of FIG. 3.

FIG. 5 is a transverse vertical cross-sectional view taken substantially on the line 5—5 of FIG. 3.

FIG. 6 is a transverse vertical cross-sectional view taken substantially on the line 6—6 of FIG. 3.

Referring to the drawings, 11 generally designates a ditch-cleaning apparatus according to the present invention. The apparatus 11 comprises a rigid main frame member 12 consisting of an elongated tubular bar 13 rigidly secured at its forward end to a transverse crossarm 14 and provided at its junction with the midpoint of the crossbar 14 with an upstanding vertical arm 15. The opposite ends of the crossarm 14 are provided with pivot studs 16,16 whereby said crossbar ends are adapted to be connected by link bars 17,17 to the rear portion of the frame of a conventional tractor 18 in the manner illustrated in FIGS. 1 and 2. As shown in these Figures, the intermediate portions of the link bars 17,17 are connected by further link bars 19,19 to rotatable elevating arms 20,20 provided on the tractor 18 and operated in a conventional manner to, at times, raise the link bars 17,17 when it is desired to elevate the main frame member 12 and the implement 11, as will be presently described.

The top end of the upstanding vertical arm 15 is provided with a pair of spaced apertured lugs 21,21 between which is received the end of a control link bar member 22, pivotally connected between the lugs 21,21 at 23. The top link bar member 22 is connected to the tractor elevating mechanism in a conventional manner, and forms part of the structure for raising and lowering main frame bar 12 and the implement 11.

The rear end portion of the tubular bar 13 is integrally formed with a vertical downwardly facing cylindrical cup member 24 acting as a guide sleeve which slidably receives an upstanding hollow post member 25 integrally formed on a longitudinally extending shaft-bearing sleeve 26. Journaled in the bearing sleeve 26 is a shaft 27 whose forward end is connected by a universal joint assembly 28 to a squared shaft 29 which is slidably and nonrotatably received in a sleeve member 30 which has a squared bore in which shaft member 29 slidably fits. The forward end of the sleeve member 30 is adapted to be connected to the power takeoff shaft 32 of the tractor 18 to which the implement is attached.

An adjusting screw 33 is rotatably supported in a central bore provided in the top wall of the cup member 24, being provided with a bearing collar 34, as shown in FIG. 3. The adjusting screw 33 is threadedly engaged through the center of the top wall of the upstanding hollow post member 25, as shown in FIG. 3, whereby the post member 25 may be adjusted in the cup member 24 by rotating the adjusting screw 33. This enables the implement to be adjusted to provide the desired depth of cut, as will be presently described.

Secured on the rear end of the shaft 27 is a rotor assembly 36 comprising a circular main body 37 having the integral hub portion 38 provided with an axial bore in which shaft 27 is received and rigidly secured in any suitable manner, as by locking screws 39. The disc 37 is provided with a pair of integral diametrically opposed forwardly directed vanes 40,40 of generally trapezoidal shape whose outer edges 41 are substantially flush with the periphery of the disc member 37, as shown in FIGS. 5 and 6. Also secured to the disc member 37 are a plurality of spaced cutter assemblies 42 having forwardly projecting arcuately shaped blade elements 43 located adjacent the periphery of the disc 37 and projecting forwardly therefrom. The cutter assemblies 42 are preferably spaced at equal angles around the axis of shaft 27 and are preferably symmetrically located on the opposite sides of the radial vane elements 40,40, in the manner illustrated in FIG. 6. As shown in FIG. 6, the blades 43 are arranged to extend substantially circumferentially relative to the disc member 37, whereas the vanes 40,40 extend substantially radially thereof.

Designated generally at 45 is a transversely extending guard plate which is rigidly secured at 47 to the vertical cup member 24 and which is located forwardly adjacent the rotor 36, as shown in FIG. 2. The guard plate member 45 is provided at its top margin with an upwardly and rearwardly inclined deflecting flange 46 which partially overlies the rotor 36 and which serves to deflect material thrown upwardly therefrom in a manner presently to be described. The guard plate 45 is somewhat asymmetrical, as shown in FIG. 4, projecting laterally in accordance with the direction of rotation of the rotor 36. Thus, if the rotor 36 moves in a clockwise direction, as viewed in FIG. 4, the plate 45 projects laterally to the left.

Thus, as shown in FIG. 4, the deflecting flange 46 extends further to the left over the rotor 36 than to the right, in view of the clockwise direction of rotation of the rotor, above-mentioned.

The guard plate 45 is formed with the downwardly diverging rigidifying channels 48,48 to which are rigidly secured the opposite longitudinally extending, generally arcuately shaped, outwardly convex shoes, or skids, 49,49 adapted to engage the bottom of a trench 50 to be cleared, as will be presently described, and to slidably support the implement 11 as it is moved through the trench, or ditch 50. The skids 49,49 are provided with upwardly and forwardly inclined front runner portions 51,51 which facilitate the forward advancement of the skids 49,49 as the implement 11 is pulled through the ditch 50.

In operation, with the implement 11 lowered into the ditch 50 in operative position, as shown in FIGS. 1 and 2, and with the shaft 27 driven by the tractor takeoff shaft 32, as the tractor is moved forwardly over the ditch 50, the rotor 36 revolves and cuts away grass, weeds, silt, or any other undesirable material in the ditch, the cutters 43 providing the desired cutting action and the vanes 40,40 providing a clearing action.

The loosened material is thrown upwardly and impinges against the deflection flange 46, ans is deflected by said flange upwardly and away from the ditch, in view of the fact that the material is thrown upwardly and laterally by the rotor 36. The loosened material is thus thrown laterally of the ditch, rather than back into the ditch because of this active cooperation between the inclined deflection flange 46 and rotor 36.

The depth of cut may be regulated by adjusting the screw 33 in the manner above-described, rotation of the screw in one direction causing the rotor 36 to be lowered, and rotation in the opposite direction causing the rotor 36 to be elevated.

When the implement 11 is to be transported by the tractor 18 to a different location, it is elevated by activating the elevating mechanism of the tractor, including the arms 20,20 and the link bar member 22, whereby the implement 11 may be lifted clear of the ground and may be transported by the tractor to any desired location, for example, from one ditch which has been cleared to a second ditch which is to be cleared.

It will be noted from FIGS. 3 and 5 that in the normal position of operation of the implement, namely, with the rotor 36 adjusted to a typical operating position relative to the attachment frame 12, the cylindrical surface defining the outwardly convex surfaces of the skids 49,49 is substantially coaxial with and substantially contains the periphery of the rotor 36. The adjusting screw 33 allows for some variation of this normally centered position of the rotor 36, allowing for some adjustment of the rotor upwardly, or downwardly, as desired, from this centered position.

It will be noted that the above-described ditch-cleaning implement is especially suitable for a wide range of conditions in cleaning out irrigation ditches, or similar ditches. For example, it can plow out grass, weeds, silt, or any other debris in a ditch. It does not plug the outlets in the system, since it is self-clearing in action. Therefore, such outlets do not have to be reopened by means of a shovel. It discharges the cleared material sufficiently far from the ditch so that it does not affect the normal contour of the ditch. Furthermore, it does not leave a plug in the ditch when it is elevated therefrom. Also, because of the control of the adjusted height of the rotor 36, it can be employed to clear or clean a ditch without making the ditch substantially deeper or wider. Furthermore, it can be employed to clean a ditch regardless of whether there is water in the ditch, or the ditch is dry. Similarly, because of the controlled cutting or clearing action of the rotor 36, it can be employed without breaking the seal in a ditch which is lined with sealing material, such as bentonite, or the like.

While a specific embodiment of an improved irrigation ditch cleaner has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A ditch cleaner comprising frame means, means to attach said frame means to the rear portion of a pulling vehicle for pivoting action on a transverse horizontal axis, a pair of depending substantially parallel longitudinal outwardly convex supporting skid members secured to said frame means, said skid members having main body portions contained in a common cylindrical surface, said skid members being adapted to slidably and supportingly engage on the bottom of a ditch, longitudinal shaft means journaled in said frame means substantially coaxially with respect to said skid members, a rotor secured on said shaft means rearwardly adjacent said frame means, said rotor comprising a disc provided with diametrically opposite radial scraper blades and spaced peripheral axially directed arcuate cutting blades located on opposite sides of the scraper blades, the arcuate cutting blades and the outer edges of the scraper blades being normally located substantially in said common cylindrical surface and said blades projecting forwardly from said disc toward said frame means, said frame means including a vertical transverse platelike guard member forwardly adjacent said blades, said guard member projecting laterally from said frame means and being provided at its top with an upwardly and rearwardly inclined deflection flange overlying said blades and acting to deflect upwardly thrown material rearwardly and laterally from said frame means, and means to adjust the rotor vertically from a normally centered position relative to said common cylindrical surface.

2. The ditch cleaner of claim 1 and wherein said skid members are provided with forwardly convergent front end portions.

3. The ditch cleaner of claim 1, and wherein said adjusting means comprises a downwardly facing vertical cup member on said frame means, a post member slidably received in said cup member, rotatable adjusting screw means interengaged between said post member and cup member to adjust said post member in said cup member, and a shaft journal sleeve rigidly secured to said post member, said shaft means being rotatableengaged in said journal sleeve, whereby said rotor may be vertically adjusted relative to said skid members by rotating said screw means.

* * * * *